United States Patent
Roggendorf et al.

(10) Patent No.: US 7,308,005 B1
(45) Date of Patent: Dec. 11, 2007

(54) TIME DIVISION MULTIPLE ACCESS SYSTEM AND METHOD FOR USING AVAILABLE TDMA SLOT TIME TO TRANSMIT ADDITIONAL MESSAGES

(75) Inventors: Brian R. Roggendorf, Cedar Rapids, IA (US); Eric O. Zuber, South Amana, IA (US); Jeffrey A. Schroeder, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1045 days.

(21) Appl. No.: 10/252,483

(22) Filed: Sep. 23, 2002

(51) Int. Cl.
*H04J 3/06* (2006.01)
(52) U.S. Cl. .................. 370/508; 370/326; 370/336; 370/347; 370/442; 370/468
(58) Field of Classification Search ............. 370/277, 370/280, 294, 316, 321, 322, 326, 328, 329, 370/336, 337, 345, 347, 348; 455/12.1, 414.2, 455/427, 450, 456.1, 456.3, 509, 516, 527
See application file for complete search history.

(56) References Cited

U.S. PATENT DOCUMENTS

| | | | | |
|---|---|---|---|---|
| 5,329,530 | A * | 7/1994 | Kojima | 370/348 |
| 5,640,672 | A * | 6/1997 | Nawata | 455/12.1 |
| 5,802,046 | A * | 9/1998 | Scott | 370/280 |
| 6,005,856 | A * | 12/1999 | Jensen et al. | 370/337 |
| 6,707,807 | B1 * | 3/2004 | Menzel | 370/337 |
| 2002/0087572 | A1 * | 7/2002 | Hopkins | 707/101 |

FOREIGN PATENT DOCUMENTS

GB          2327019 A    *    1/1999

OTHER PUBLICATIONS

Hazeltine, GEG-Marconi, "Link-16 Summary," XP-002175223, HTTP://PRODEVWEB.PRODEV.USNA.EDU., Apr. 1997, Summary Written, May 1997. pp. 1-6.*

Golliday, C., Jr., "Data Link Communications in Tactical Air Command and Control Systems," IEEE Journal on Selected Areas in Communications, Sep. 1985. vol. 4, iss. 5. pp. 779-791.*

(Continued)

*Primary Examiner*—Wellington Chin
*Assistant Examiner*—Donald L. Mills
(74) *Attorney, Agent, or Firm*—Nathan O. Jensen; Kyle Eppele

(57) ABSTRACT

A method and system for providing time division multiple access communications is disclosed. The disclosure includes sending a first message in a time slot. The time slot has a slot length. The first message has a first time associated therewith. The first time includes the time required to send the first message and the propagation delay associated with the reception of the first message by a second transceiver. The disclosure also includes determining time remaining in the time slot for sending a second message. The time remaining is based on the first time and the slot length. The disclosure also relates to sending a second message in the time slot if the length of the second message plus the length of the propagation delay associated with the second message is less than the time remaining in the time slot.

34 Claims, 2 Drawing Sheets

OTHER PUBLICATIONS

Altrichter, W.W., "JTIDS Relative Navigation and Data Registration," IEEE Aerospace and Electronic Systems Magazine, Jun. 1992. vol. 7, iss. 6. pp. 42-50.*

Corman, D. et al., "Weapons Systems Open Architecture—A Bridge Between "Embedded" and "Off-board"," IEEE Aerospace and Electronic Systems Magazine, Nov. 2002. vol. 17, iss. 11. pp. 21-25.*

* cited by examiner

■ HIGH POWER TRANSMITTER
▲ LOW POWER TRANSMITTER

■ HIGH POWER TRANSMITTER
▲ LOW POWER TRANSMITTER

TIME DIVISION MULTIPLE ACCESS SYSTEM AND METHOD FOR USING AVAILABLE TDMA SLOT TIME TO TRANSMIT ADDITIONAL MESSAGES

BACKGROUND

Conventional time division multiple access (TDMA) networks are used to provide communications between a plurality of ratio frequency transceiver devices. In such systems, slices of time (or time slots) typically have a predefined slot length (time). Conventionally, individual slots are allocated to individual terminals during which time the individual terminal is allowed to transmit data. The length of each slot must be greater than the sum of the largest possible transmitting time plus the maximum possible propagation delay to ensure that each terminal has the opportunity to receive the transmitted data during the slot.

Because there may be unused time during a particular time slot which occurs after a message is sent and after a propagation delay associated with the sent message as received by another transceiver, there may be unused bandwidth in conventional TDMA networks during which time it may be possible to transmit other data.

Accordingly, there is a need for a method and apparatus which utilizes unused bandwidth in a TDMA network. Further, there is a need for a system and method for determining whether unused bandwidth may be used by a transceiver. Yet further still, there is a need for a radio frequency (RF) TDMA system in which unused slot time is filled with data transmissions.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An example of the invention relates to a method of providing time division multiple access communications. The method includes sending a first message in a time slot. The time slot has a slot length. The first message has a first time associated therewith. The first time includes the time required to send the first message and the propagation delay associated with the reception of the first message by a second transceiver. The method also includes determining time remaining in the time slot for sending a second message, based on the first time and the slot length. Further, the method includes sending a second message in the time slot if the length of the second message plus the length of the maximum propagation delay associated with the second message (which is a function of transmit power) is less than the time remaining in the slot.

Another example of the invention relates to a time division multiple access radio system. The time division multiple access radio system includes a radio frequency transceiver. The time division multiple access radio system also includes a processor coupled to the radio frequency transceiver. The processor is configured to determine whether sufficient time remains in a slot to send, via the transceiver, a second message in a time slot after sending or receiving, via the transceiver, a first message in a time slot, while accounting for the maximum propagation delays associated with the first and the second messages. The maximum propagation delay may be controlled by limiting transmit power levels.

Yet another example of the invention relates to an apparatus for providing time division multiple access communications. The apparatus includes a means for sending a first message in a time slot. The time slot has a slot length. The first message has a first time associated therewith. The first time includes the time required to send the first message and the propagation delay associated with the reception of the first message by a second transceiver. The apparatus also includes a means for determining time remaining in the time slot for sending a second message, based on the first time and the slot length. Further, the apparatus includes a means for sending a second message in the time slot by the second transceiver if the length of the second message plus the length of the propagation delay associated with the second message is less than the time remaining in this time slot.

Further still, an example of the invention relates to a method of providing time division multiple access communications. The method includes transmitting within a first time slot identification and location information of a group of known transmitters. The method also includes transmitting in the first time slot, by a first transmitter not in the group of known transmitters, location and identification information of the first transmitter. Further, the method includes transmitting location and identification information, in a second time slot, of a high power transmitter.

Yet further still, an example of the invention relates to a time division multiple access signal. The signal includes a first transmission within a time slot. The time slot has a slot length. The first transmission has a first propagation delay to a second transceiver. The signal also includes a second transmission in the time slot. The second transmission has a maximum propagation delay which is a function of transmit power. The second transmission occurs only if the sum of the length of the first transmission, the first propagation delay, the second transmission, and the second propagation delay is less than the length of the time slot.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
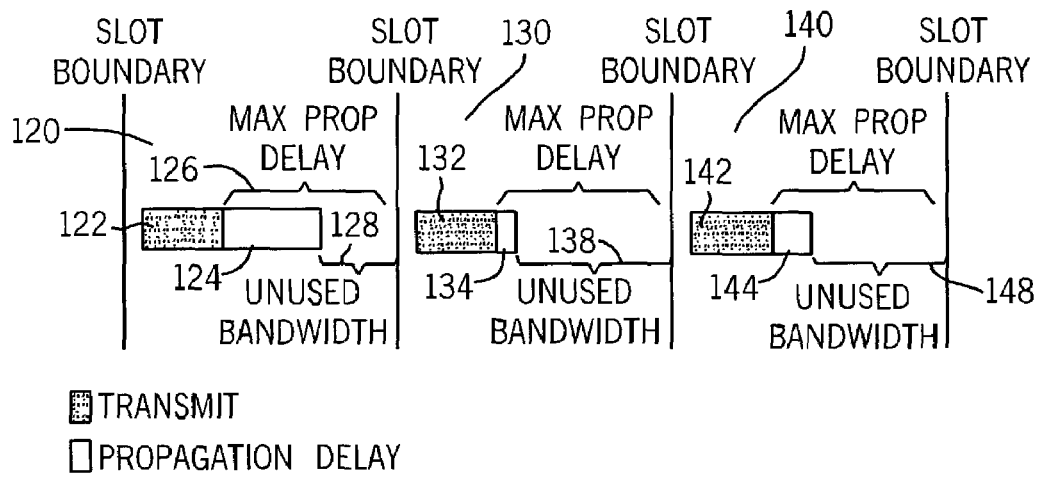
FIG. 1 is a diagram depicting conventional time slot usage in a TDMA system.

Referring to FIG. 1, three time slots 120, 130, and 140 are depicted. Each time slot is provided to allow a specified transmitter to transmit during each time slot. For example, a transmitter may be allocated slot 120 in which a transmission 122 is made. Depending upon the range to a given receiver, a propagation delay 124 may be determined. Propagation delay 124 may be less than the maximum propagation delay 126 that is accounted for in determining the necessary slot length for each slot. Accordingly, there is unused bandwidth 128 in time slot 120 at the location of that receiver. Similarly, referring to slot 130, a transmission 132 is made by a transmitter assigned to transmit in slot 130. However, in contrast to the transmission 122, transmission 132 has a propagation delay 134 to that receiver that is much less than the propagation delay 124. Propagation delay is a function of the distance between the transmitter and receiver.

Figure 2:
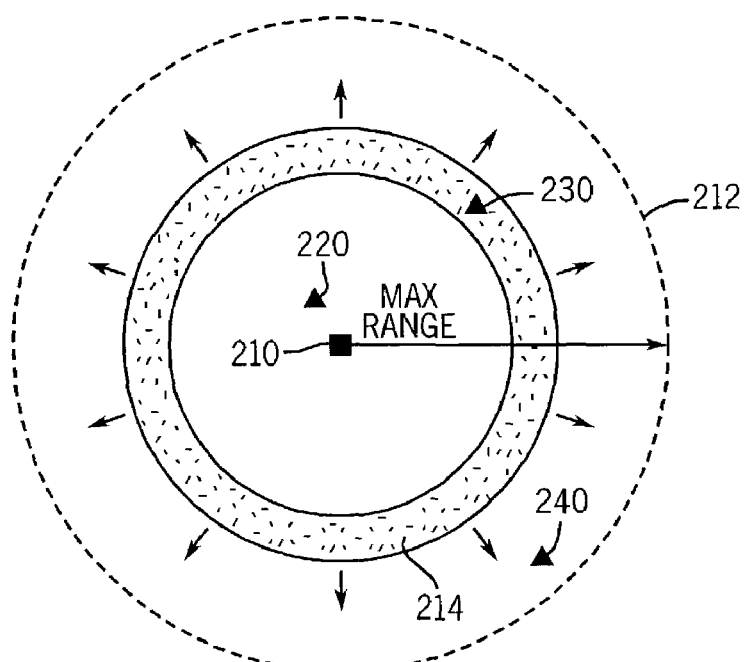
FIG. 2 is an exemplary depiction of signal propagation from a high power transmitter.

For example, referring to FIG. 2, a high power transmitter 210 is depicted. Transmitter 210 is configured to transmit radio frequency signals to all other transceivers (in this case 220, 230, and 240). Each of transceivers 220, 230, and 240 lie within the maximum range 212 of transmitter 210. The transmission depicted by shaded area 214 requires a certain time to reach the maximum range 212. This time may be termed the maximum propagation delay. Accordingly, for lower power transmitters who have a shorter maximum range, the maximum propagation delay is much less than for a high power transmitter such as transmitter 210.

Referring again to FIG. 1, because each of transmissions 122, 132, and 142 with associated propagation delays 124, 134, and 144 to a particular receiver, unused bandwidth 128, 138 and 148 is associated with each slot in the geographic vicinity of the receiver. The length of each slot, therefore, must be greater than the sum of the largest possible transmitting time plus the maximum possible propagation delay to ensure that each transceiver has the opportunity to receive the transmitted data.

Low power terminals having a limited range and, therefore, a shorter maximum propagation delay, may be able to transmit later in a particular slot because the radio frequency energy would dissipate prior to the beginning of the subsequent slot.

Figure 3:
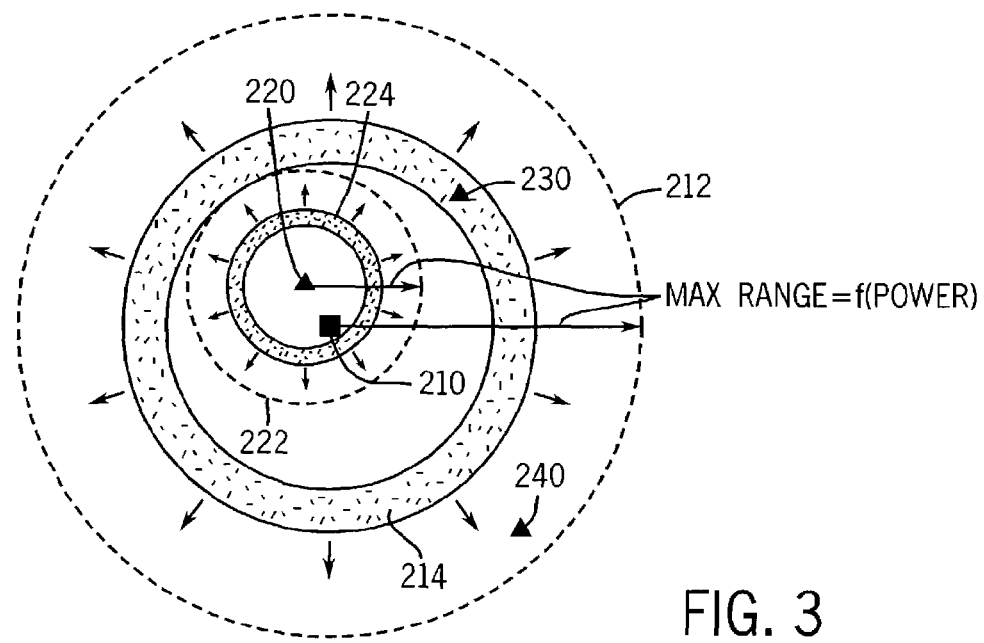
FIG. 3 is an exemplary depiction of signal propagation from both a high power transmitter and a low power transmitter.

For example, referring to FIG. 3, high power transmitter 210 having maximum range 212 may be sending RF signal 214. Further, low power transmitter 220 is depicted sending a signal 224 having a maximum range 222. Accordingly, one can see that the maximum propagation delay for transmitter 220 is much less than the propagation delay associated with transmission 214 from transmitter 210. Accordingly, in a system having both low power and high power transmitters (or transmitters capable of low and high power), the system described may be applicable to use previously unused bandwidth.

Figure 4:
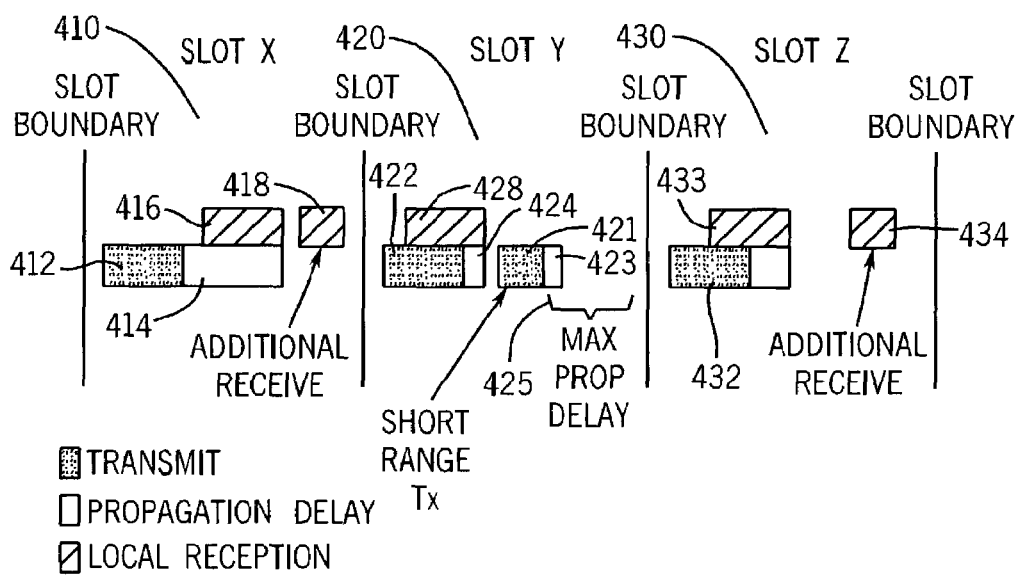
FIG. 4 is an exemplary depiction of time slots with conventionally unused bandwidth being selectively utilized by low power transmissions.

Referring now to FIG. 4, three time slots, slot X 410, slot Y 420, and slot Z 430, are depicted. In slot X 410, a transmitter assigned to send information in slot X 410 transmits a signal 412 having an associated propagation delay 414 to a second transceiver. After transmission 412, a signal 416 is received by the second transceiver which is within the range of the transmitter sending transmission 412. Because of the length of the propagation delay for transmission 412, there is not adequate time remaining in time slot X 410 for the second transceiver to send another message due to the maximum propagation delay (which is a function of the power of the transmitter). However, it is possible for a third transceiver that is nearer to the first transceiver than the second transceiver to transmit a message at low power during the remaining slot time of slot X 410. Accordingly, an additional reception 418 may be made by the second transceiver of such a lower powered signal. In order to carry out such a procedure, coordination of multiple short range participants as to which transceiver or terminal will be allowed to create the short range transmission, such as short range transmission 418 in each slot, must be done to prevent jamming (or interference) of the system.

With reference to slot Y 420, a signal 422 is transmitted by a first terminal. Signal 422 is received by a second transceiver represented by reception 428. Because the distance between the first transceiver and second transceiver is relatively small, propagation delay 424 is relatively short. Accordingly, the second transceiver sending message 422 may produce a second short range transmission 421 having a propagation delay 423 to the first transceiver associated therewith. The second transceiver making transmission 422 determines that there is significant time in slot Y 420 to transmit a second message taking into account the inclusion of the maximum propagation delay 423. In such a transmission, bandwidth that would otherwise be unused in used by transmission 421.

In slot Z 430, a terminal having slot Z allocated to it for transmission (first transceiver) transmits a message (signal) 432 to receivers within the maximum range of the terminal sending message 432. Message 432 is received (reception) 433 by the second transceiver. In the example shown, it may be possible for the second transceiver to provide a second transmission within the boundaries of slot 430, however, it may also be the case that the second transceiver has no more information to transmit. Accordingly, another transmitter may elect to transmit message 434 within the remaining time in slot Z 430 in order to utilize otherwise unused bandwidth. Such a second transmission must be properly coordinated with other participant terminals in order to prevent jamming and/or interference. Alternatively, statistical means may be used to achieve the same effect. Transmission 434 will be received by nearby terminals and may include the terminal that sent message 432.

In an exemplary embodiment, terminals making use of the described methods may include Link-16 terminals. The United States Government and its military forces often utilize Link-16 radio frequency networks for communication of data or information. The information may include tactical, positioning, navigational, voice, and other information utilized by military intelligence and other government institutions. Link-16 transmitters and receivers (i.e., terminals and/or transceivers) can be mounted on a variety of platforms, including aircraft, naval ships, or even backpacks worn by army personnel.

In general, the information in a Link-16 network is transmitted across the airwaves via radio signals (e.g., at frequencies of 969 to 1206 megahertz) which are encrypted on 51 different channels so only users who possess Link-16 terminals can receive the information. The information may be sensitive information, such as a tactical picture of battlefield conditions, identification of friends and foes, voice communication, or navigational information. The National Security Agency (NSA) tightly regulates the sale and use of terminals or devices capable of operating with a Link-16 network. Generally, the NSA requires that Link-16 terminals be controlled by U.S. Forces or very close allies of the United States to protect encryption techniques utilized in Link-16 networks. The Link-16 waveform is based on a 128 hertz slot rate with each slot requiring 7.8125 milliseconds. However, the methods and systems disclosed are not limited to such a slot rate and, further, are not limited to the use of Link-16 transceivers. In the Link-16 system, transceivers may be configured to accommodate transmission ranges of over 300 miles. In such a situation, more than 2.1 milliseconds must be set aside for propagation delay. Still, during that time interval, sufficient time may remain for a meaningful transmission that has a short maximum propagation delay.

The systems and methods described allow for significant improvement in the efficiency of the TDMA communication networks when a large number of terminals are present, many being of very low power (e.g., man portable ground terminals). In an exemplary embodiment, the described protocol and methods are centered around the need to protect personnel on the ground from friendly fire and for providing high-rate localized target data to strike aircraft.

In an exemplary embodiment, a network participation group (NPG) may be used to support close air support (CAS). In such a situation, multiple message slots may be limited to CAS NPG slot assignments such that only strike-capable platforms (e.g., aircraft) need deal with received second messages. Each strike-capable platform would be allocated CAS NPG slots at a fairly high rate (e.g., less than 1.5 seconds). The full power, airborne strike aircraft terminal would transmit indirect precise participant location and identification (PPLI) information (e.g., a J2.0 message) representing the location of the low power terminals as the first message. Alternatively, direct PLLIs (e.g., a J2.2 message) would be transmitted if there are no known ground units. A low power terminal would then transmit a second message containing information about itself as well as other friendlies and hostiles. During the next transmit opportunity, after a second message is received, the high power terminal would transmit a J2.0 representing that unit and embed within the J2.0 a different channel for the ground unit to switch to for further responses. In this manner, other units may respond on the default channel to broadcast their positions. If the strike aircraft has specific interest in a particular platform due to its relative location to a hostile position, it may transition to that channel thereby receiving high rate information. Each unit within the low power transmission range may be given a unique channel.

To minimize coincidental transmissions, a method may be employed to limit the number of second transmissions in any given slot to the extent possible. An exemplary method may be to embed, within each first message, commands to low power terminals to transmit the second transmissions on other channels (e.g., frequency hop patterns). This allows the terminal transmitting the first message to focus either on new (unknown) terminals or to focus on a group of terminals in a specific geographic location such as nearest a strike point.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown are described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of providing time division multiple access (TDMA) communications, comprising:

receiving, at a second transceiver, a first message sent from a first transceiver in a time slot, the time slot being a single TDMA time slot having a pre-determined slot length;

determining a time remaining in the time slot for sending a second message from the second transceiver, based on the reception of the first message and the slot length;

determining a maximum propagation delay that may be associated with the second message based on transmit power capabilities of the second transceiver; and the second transceiver sending a second message in the time slot if the length of the second message plus the length of the maximum propagation delay associated with the second message is less than the time remaining in the time slot.

2. The method of claim 1, further comprising:

the second transceiver receiving a third message in the time slot and sending a fourth message if the length of the fourth message plus the length of the maximum propagation delay associated with the fourth message is less than the time remaining in the time slot.

3. The method of claim 2, further comprising:

the second transceiving receiving a fifth message in the time slot, the fifth message being sent from a third transceiver.

4. The method of claim 1 further comprising:

the second tranceiver transmitting a third message in the time slot.

5. The method of claim 4 further comprising:

the second transceiver transmitting a fourth message in the time slot.

6. The method of claim 1, wherein the second message includes precise participant location and identification (PPLI) information.

7. The method of claim 1, wherein the sending steps are provided by a Link-16 transceiver.

8. The method of claim 1, wherein the second transceiver includes a low power transceiver.

9. The method of claim 1, wherein the second transceiver includes a high power transmitter performing a low power transmission.

10. The method of claim 1, wherein the slot length is 7.8125 milliseconds.

11. A time division multiple access radio system, comprising:

a radio frequency transceiver; and a processor coupled to the radio frequency transceiver, wherein the processor is configured to determine whether sufficient time remains in a slot to send, via the transceiver, a second message in a time slot after sending, via the transceiver, a first message in a time slot, while accounting for the time remaining in the slot and the sum of the largest possible transmit time for the second message plus the maximum propagation delay associated with the second message, and wherein the processor is further configured to calculate the maximum propagation delay using one of a known distance to a remote receiving device and a known transmit power capability of the radio frequency transceiver.

12. The time division multiple access radio system of claim 11, wherein the radio frequency transceiver is a Link-16 transceiver.

13. The time division multiple access radio system of claim 11, wherein the length of the time slot is 7.8125 milliseconds.

14. The time division multiple access radio system of claim 11, wherein the transmitter of the second message transmits at lower power than the transmitter of the first message.

15. The time division multiple access radio system of claim 11, wherein the transmission of both the first message and second message are less than the maximum power allowed within the network structure as limited by the slot length.

16. The time division multiple access radio system of claim 11, wherein the propagation delays are each less than 3.9 milliseconds.

17. The time division multiple access radio system of claim 11, wherein the second message includes precise participant location and identification information.

18. An apparatus for providing time division multiple access communications, comprising:
   means for sending a first message in a time slot, the time slot having a slot length, and the first message having a first time associated therewith, the first time including the time required to send the first message and the propagation delay associated with the reception of the first message by a second transceiver;
   means for determining time remaining in the time slot for sending a second message, based on the first time and the slot length; and
   means for sending a second message in the time slot if the length of the second message plus the length of the maximum propagation delay associated with the second message, is less than the time remaining in the time slot, wherein the maximum propagation delay is determined based on the time remaining in the time slot and a transmit power characteristic of the means for sending a second message.

19. The apparatus of claim 18, further comprising:
   means for receiving a third message in the time slot.

20. The apparatus of claim 19, further comprising:
   means for receiving a fourth message in the time slot.

21. The apparatus of claim 18, further comprising:
   means for transmitting a third message in the time slot.

22. The apparatus of claim 21, further comprising:
   means for transmitting a fourth message in the time slot.

23. The apparatus of claim 18, wherein the second message includes precise participant location and identification (PPLI) information.

24. The apparatus of claim 18, wherein the sending steps are provided by a Link-16 transceiver.

25. The apparatus of claim 18, wherein the transceiver performing the sending includes a low power transceiver or a full power transceiver with the ability to transmit at low power.

26. The apparatus of claim 18, wherein the transceiver performing the sending includes a high power transmitter with the ability to transmit at low power.

27. The apparatus of claim 18, wherein the slot length is 7.8125 milliseconds.

28. A method of providing time division multiple access communications, comprising:
   (a) transmitting within a first time slot, the first time slot having a pre-determined length, identification and location information of a group of known transmitters;
   (b) transmitting in the first time slot, by a first transmitter not in the group of known transmitters location and identification information of the first transmitter, wherein the first transmitter determines a time remaining in the first time slot after reception of the identification and location information of the group of known transmitters, and wherein the first transmitter determines whether to transmit in the first time slot based on the time remaining in the first time slot compared to a maximum propagation delay, the maximum propagation delay being based on a transmit power characteristic of the first transmitter; and
   (c) transmitting location and identification information, in a second time slot, of a high power transmitter.

29. The method of claim 28, wherein the transmission of step (c) includes alternate channel information.

30. The method of claim 28, wherein the transmission of step (a) includes precise participant location and identification (PPLI) information.

31. The method of claim 28, wherein the transmission of step (b) includes precise participant location and identification (PPLI) information.

32. The method of claim 28, wherein the high power transmitter is associated with an aircraft.

33. The method of claim 28, wherein the transmitter include Link-16 transceivers.

34. A time division multiple access signal, comprising:
   a first transmission within a time slot, having a slot length and the first transmission having a first maximum propagation delay; and
   a second transmission in the time slot, the second transmission having a second maximum propagation delay, the second transmission occurring only if the sum of the length of the first transmission, the first propagation delay, the second transmission, and the second propagation delay is less than the length of the time slot,
   wherein the first transmission is sent by a high-powered transceiver and includes embedded commands for a low-powered transceiver to transmit the second transmission on other channels, and wherein the second transmission is sent from a second transceiver in frequency hop patterns because of the embedded commands.

* * * * *